United States Patent

Nilsson et al.

Patent Number: 5,800,070
Date of Patent: Sep. 1, 1998

[54] DAMPING DEVICE

[75] Inventors: Sven-Åke Nilsson, Gnesta; Robert Sandblom, Älvsjö, both of Sweden

[73] Assignee: Alfa Laval AB, Lund, Sweden

[21] Appl. No.: 860,045

[22] PCT Filed: Oct. 9, 1996

[86] PCT No.: PCT/SE96/01279

§ 371 Date: Jun. 6, 1997

§ 102(e) Date: Jun. 6, 1997

[87] PCT Pub. No.: WO97/13583

PCT Pub. Date: Apr. 17, 1997

[30] Foreign Application Priority Data

Oct. 1, 1909 [SE] Sweden .................. 9503527

[51] Int. Cl.$^6$ .................................. F16C 27/00
[52] U.S. Cl. .................................. 384/535
[58] Field of Search .................. 384/535, 581

[56] References Cited

U.S. PATENT DOCUMENTS

| | | | |
|---|---|---|---|
| 2,487,343 | 11/1949 | Kopf | 384/535 |
| 2,556,317 | 6/1951 | Cook | 384/535 |
| 3,052,166 | 9/1962 | Thrun | 384/535 X |
| 5,088,480 | 2/1992 | Radtke | 384/535 |

FOREIGN PATENT DOCUMENTS

| | | |
|---|---|---|
| 132549 | of 1901 | Germany . |
| 9002 | of 1914 | United Kingdom . |
| WO 8910794 | 11/1989 | WIPO . |

*Primary Examiner*—Thomas R. Hannon
*Attorney, Agent, or Firm*—Fish & Richardson P.C.

[57] ABSTRACT

Damping device for a shaft, which supports a centrifugal rotor and is journalled in a bearing in a frame (7) in such a way that an oscillating movement of the shaft relative to the frame (7) is admitted during the rotation of the rotor (5). The damping device comprises a first friction member (8), which is connected to a bearing in such a way that the shaft is rotatable relative to the friction member, and a number of second friction members (10), which are supported by the frame (7) and are distributed around the shaft, each one of the second friction members (10) being arranged to be so kept pressed by a spring force towards the first friction member (8) in a predetermined direction that upon oscillating movement of the shaft (1) perpendicular to this predetermined direction a damping friction arises when the first friction member (8) together with the shaft is moving relative to the second friction member (10) referred to. In order to reduce the heat generation each one of the second friction members (10) is movable relative to the element, which it is supported by or connected to, i.e. the frame (7) or the bearing (3) perpendicular to the shaft (1) and perpendicular to said predetermined direction in a limited distance, which at least is 0.2 mm.

10 Claims, 2 Drawing Sheets

DAMPING DEVICE

FIELD OF THE INVENTION

The present invention concerns a damping device for a rotatable shaft, which supports a centrifugal rotor and is journalled in a bearing in a frame in such a way that an oscillating movement of the shaft relative to the frame is admitted during the rotation of the centrifugal rotor, the damping device comprising at least a first friction member, which is connected to said bearing in such a way that the shaft is rotatable relative to the friction member, and a number of second friction members, which are supported by the frame and are distributed around the shaft, each one of the second friction members being arranged to be so kept pressed by a spring force towards the first friction member in a predetermined direction that upon oscillating movement of the shaft perpendicular to this predetermined direction a damping friction arises when the first friction member together with the shaft is moving relative to the second friction member referred to.

BACKGROUND OF THE INVENTION

Damping devices of this kind are common in vertical centrifugal separators, in which the centrifugal rotor is supported on one end of the shaft, especially if the centrifugal rotor rotates at a number of revolutions exceeding the first critical number of revolutions.

In such a damping device each one of the said second friction members is very carefully controlled in their movements in the said predetermined direction. Thus, the friction members referred to, which normally are designed as cylindrical pistons, are placed axially movable in cylindrical drilled holes and have a very accurate sliding fit in these holes. In a normal sliding fit between such pistons and the drilled holes the diameter of the holes is 0.01–0.1 mm larger than the outer diameter of the pistons. The part of the piston, the second friction member, which is pressed against the first friction member, and the part thereof, which is controlled by the drilled hole, are mostly designed in one piece but can also as shown in DE 132549 be designed as two separate parts fixedly joint together by means of a screw joint.

Instead of arranging the first friction member, as in these damping devices, in such a way that it is connected to the bearing and arranging the second friction members in a way such that they are supported by the frame one can also, as shown in the British patent publication 9002/1913, arrange the friction members inversely i.e. arrange the first friction member in a way such that it is supported by the frame and arrange the second friction members in a way such that they are connected to the bearing instead.

It has for long been a known problem in association with damping devices of the kind described above that they cause a great heat generation. This means that the bearing, which is connected to a friction member of the kind described above, has to be operating at a rather high temperature, which shortens the life of the bearing.

SUMMARY OF THE INVENTION

The object of the present invention is to reduce the heat generation caused by a damping device of the kind now in question.

This object can thanks to the invention surprisingly be accomplished in quite an easy manner, namely, by having each one of the second friction members movable relative to the element, which it is supported by or connected to, i. e. the frame or the bearing, perpendicular to the shaft and perpendicular to said predetermined direction in a limited distance, which at least is 0.2 mm.

The result of this movability of each one of the second friction members is that the damping device does not start to function as a damping device until the shaft performs oscillating movements in the area of the damping device exceeding 0.2 mm. Upon smaller oscillating movements it is true that the said second friction members will abut the first friction member, but they will only be entrained in this oscillating movement perpendicular to the shaft within the range of said distance without resulting in a relative movement between the same and the first friction member.

When the centrifugal rotor is relatively light the shaft normally only performs oscillating movements exceeding 0.2 mm when passing certain critical number of revolutions upon start and stop of the centrifugal separator while the oscillating movements upon rotation at non-critical number of revolutions of the centrifugal rotor as the number of revolutions during normal operations are smaller than 0.2 mm. When the centrifugal rotor is heavier said predetermined distance has to according to the invention be designed longer than 0.2 mm, if damping shall be avoided at non-critical number of revolutions, e.g. somewhere in the area of 0.4–1.0 mm.

For the case where the invention is used in a damping device, in which the first friction member is connected to the bearing and the second friction members are supported by the frame it is suitable to arrange the friction members in a way such that they by means of the spring force are pressed radially inwardly against the first friction member.

On the other hand, for the case where the invention is used in a damping device, in which the first friction member is supported by the frame and the second friction members are connected to the bearing, it is suitable to arrange the friction members in such a way that they are pressed by means of the spring force radially outwardly against the first friction member. Hereby, the heat generation is made more distant from the bearing.

In an embodiment of the invention preferred in the two cases, each one of said second friction members is arranged to be pressed by means of the spring force to surface abutment towards the first friction member via essentially plane contact surfaces independent of the position of the friction device along said distance.

Thus, thanks to the invention the said springs are able to counteract the oscillating movements of the shaft with full power during normal operation of the centrifugal rotor without any unnecessary heat generation taking place. First when an abnormally large oscillating movement occurs the damping device starts to damp such oscillating movements.

BRIEF DESCRIPTION OF THE DRAWINGS

In the following the invention is described more closely with reference to the attached drawings, in which FIG. 1 schematically shows an axial section through a part of a centrifugal separator, which is provided with a damping device according to the invention.

DETAILED DESCRIPTION

Figure 1:
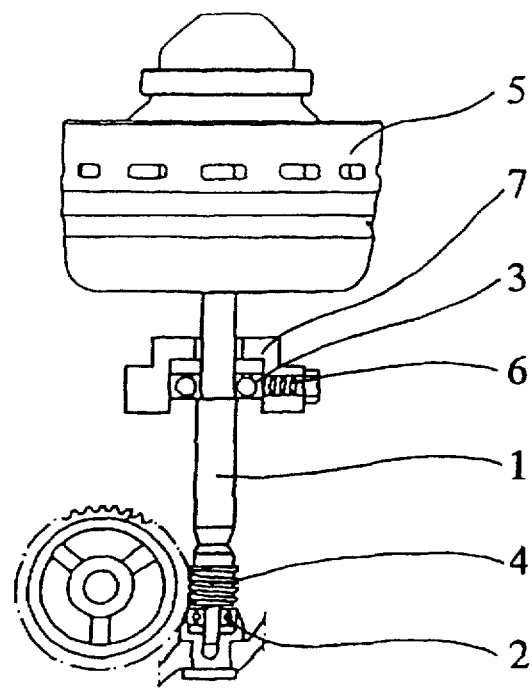

The centrifugal separator schematically shown in FIG. 1 has a vertical shaft 1, which is journalled partly in a lower bearing 2, which takes up essentially axial forces acting on the shaft 1, and partly in an upper bearing 3, which takes up essentially radial forces acting on the shaft 1. The shaft 1 is in the centrifugal separator shown as an example driven by a worm gear 4 but can of course also be belt driven.

In its upper end above the upper bearing 3 the shaft 1 supports a centrifugal rotor 5. A number of springs 6 are equally distributed around the shaft 1, which counteract but admit a limited oscillating movement of the shaft 1 and details connected thereto such as the centrifugal rotor 5 and the upper bearing 3. Each one of the springs 6 acts with a spring force in a predetermined direction between the shaft 1 and the frame 7. Between the springs 6 and the upper bearing 3 a damping device is arranged to damp oscillating movements between the shaft 1 and the frame 7.

Figure 2:
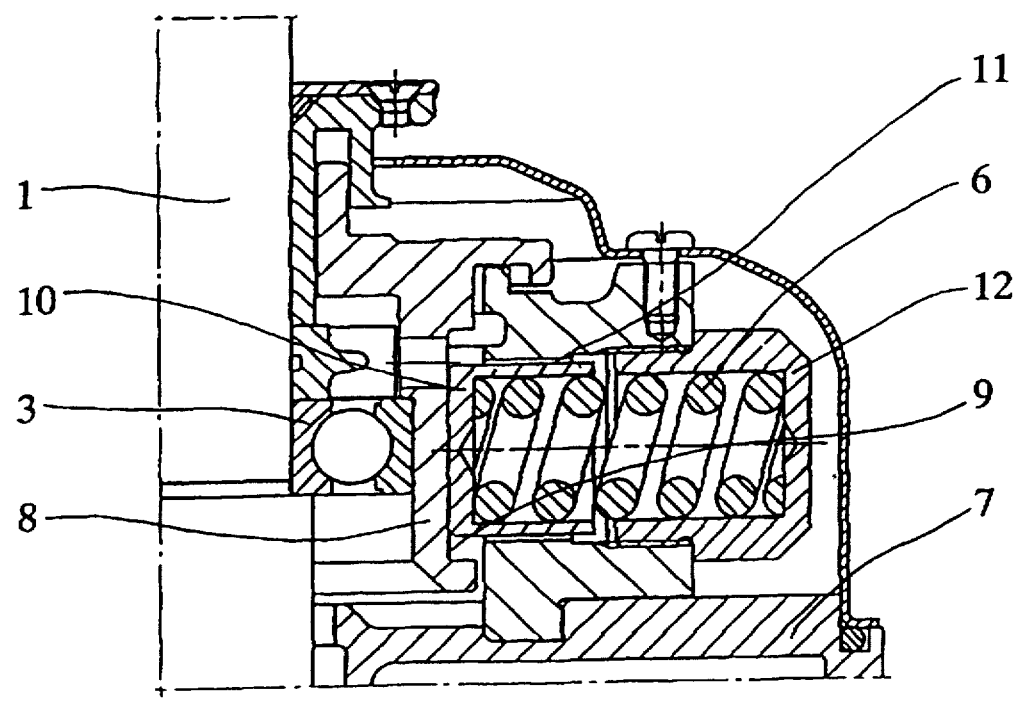
FIG. 2 shows an axial section through a part of a damping device according to the invention.
Figure 3:
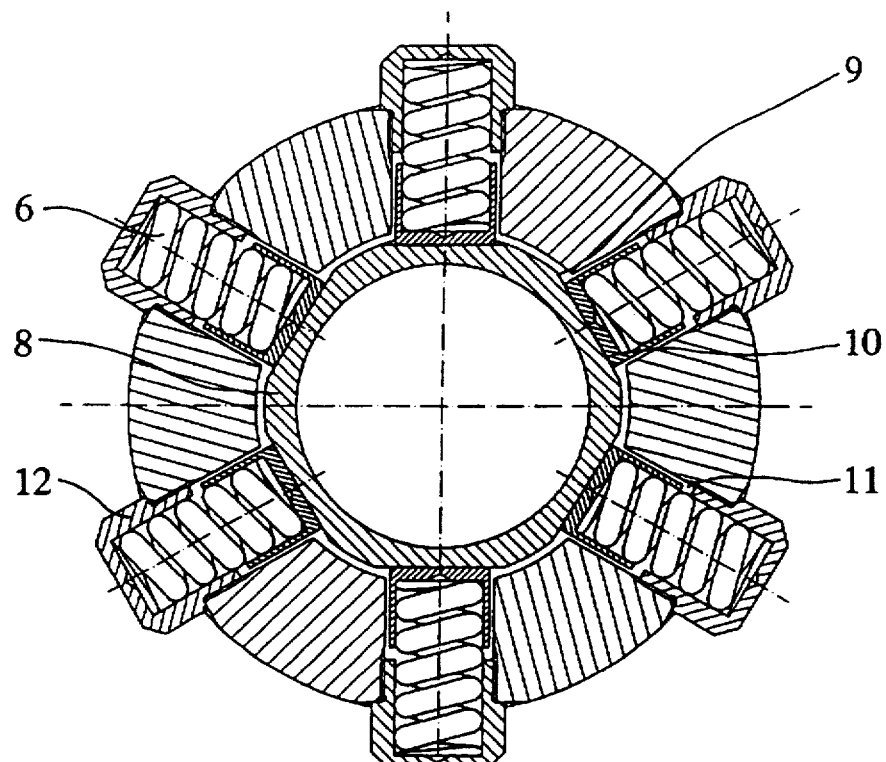
FIG. 3 shows a radial section through a damping device according to the invention.

An embodiment of a damping device according to the invention is shown in more detail in the FIGS. 2 and 3. This damping device comprises an annular first friction member 8, which surrounds the rotation axis coaxially. In this friction member 8 the upper bearing 3 is arranged. On the radially outwardly directed outside of the first friction member 8 it is provided with a number of straight radially directed plane contact surfaces 9, which are equally distributed around the rotational axis. The number of contact surfaces 9 is then as many as the number of the springs 6. In the embodiment shown in FIG. 3 of a damping device according to the invention there are six springs 6 and contact surfaces 9, respectively, drawn.

In the shown example six second friction members 10 in the shape of cylindrical pistons are pressed radially inwardly against one of these contact surfaces 9 each by means of the springs 6. In order to obtain a good abutment between the first friction member 8 and the second friction members 10 also the radially inwardly directed contact surfaces of the second friction members 10 are plane. The second friction members 10 are arranged in cylindrical holes 11, which are drilled perpendicular to the rotational axis in a part of the frame 7. In the hole 11 a spring, which has a predetermined length in unloaded condition and a predetermined spring constant, is compressed between the second friction member 10 and a plug 12 to such a length that a wanted spring force is obtained. The cylindrical holes 11 have such a larger diameter than the outer diameter of the second friction members 10 that the latter are movable relative to the frame 7 perpendicular to the shaft and perpendicular to the predetermined direction, in which the springs 6 press each one of them against the first friction member 8, a limited distance which is at least 0.2 mm. Independent of the position of the second friction member 10 along said distance it is pressed to surface abutment against the first friction member 8. Even though it is easiest to accomplish cylindrical holes their shape can also be elliptical for instance with the major axis directed perpendicular to the shaft and perpendicular to the predetermined direction.

Figure 4:
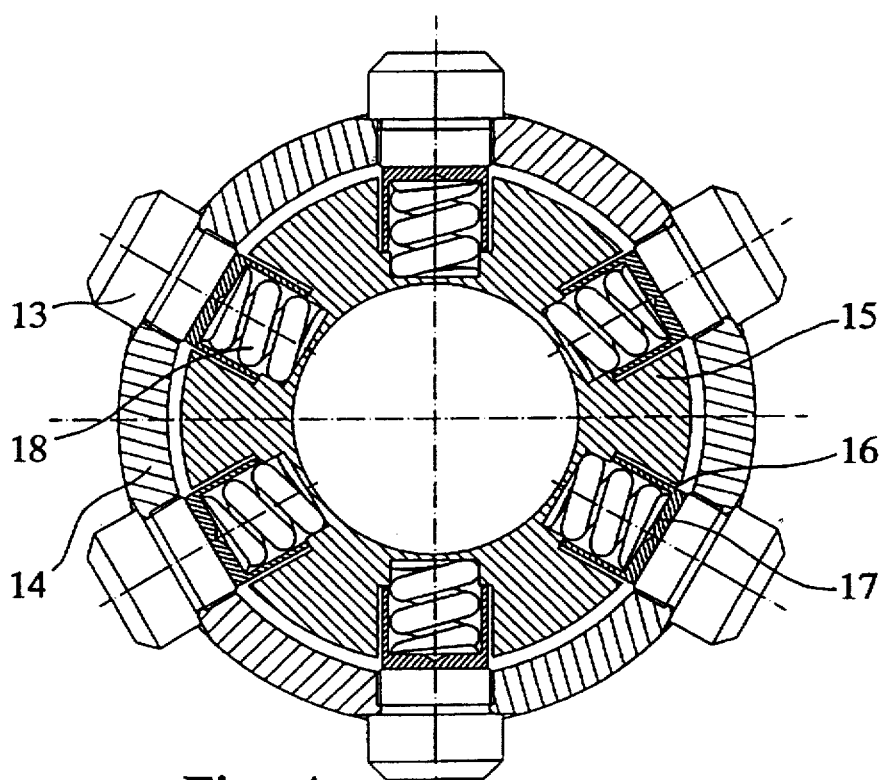
FIG. 4 shows a radial section through a damping device according to an alternative embodiment of the invention.

FIG. 4 shows an embodiment of the damping device according to the invention, in which six first friction members 13 are supported by a radial outer annular element 14, which comprises a part of the frame 7 of the centrifugal separator. Radially inside this annular element 14 a radially inner annular element 15 is arranged, in which the bearing 3 is arranged. Radially inwardly from the periphery of the inner annular element 15 six cylindrical holes 16 are drilled, which are directed towards one first friction member 13 each. In each one of these cylindrical holes 16 a second friction member 17 is arranged. These are pressed by the spring force from a spring 18 arranged in each hole 16 radially outwardly to abutment against adherent first friction member 13 with a predetermined spring force. To obtain a good surface contact the contact surfaces of both the first and the second friction members 13 and 17, respectively, are plane and radially directed. In this embodiment the cylindrical holes 16 have so much larger diameter than the outer diameter of the second friction members 17 that the latter are movable in this embodiment relative to the radially inner annular element 15, in which the bearing is arranged, perpendicular to the shaft and perpendicular to the predetermined direction, in which the springs 18 press each one of them against the first friction member 13, a limited distance which is at least 0.2 mm. The springs 18 also press in this case the friction members 13 and 17 to surface abutment against each other independent of the position of the second friction member 17 along said distance.

In the shown embodiments of a damping device according to the invention the shaft is vertical and it supports a centrifugal rotor on its one axial end, the upper end, but the invention can of course also be used in a centrifugal separator, which has a horizontal shaft, and/or in which the centrifugal rotor is arranged between two bearings as in a decanter.

The spring force is in the shown examples accomplished by means of separate mechanical helical springs. However, these can within the range of the present invention, consist of one common mechanical elastical element such as a membrane or rubber element. The spring force can alternatively also be accomplished by means of one or more hydraulic or pneumatic elements.

Even though the predetermined directions for the spring forces mentioned above are preferred the second friction elements can be pressed in other directions towards the first friction members of this spring force.

What is claimed is:

1. A damping device for a rotatable shaft (1), which supports a centrifugal rotor (5) and is journalled in a bearing (3) in a frame (7) in such a way that an oscillating movement of the shaft (1) relative to the frame (7) is admitted during the rotation of the rotor (5), the damping device comprising at least a first friction member (8), which is connected to said bearing (3) in such a way that the shaft (1) is rotatable relative to the first friction member (8), and a number of second friction members (10), which are supported by a frame (7) and are distributed around the shaft (1), each of the second friction members (10) being arranged to be so kept pressed by a spring force towards the first friction member (8) in a predetermined direction that upon oscillating movement of the shaft (1) perpendicular to this predetermined direction a damping friction arises when the first friction member (8) together with the shaft (1) is moving relative to the second friction member (10) referred to, wherein each one of the second friction members (10) is movable relative to the frame (7) perpendicular to the shaft (1) and perpendicular to said predetermined direction in a limited distance, which at least is 0.2 mm.

2. The damping device according to claim 1, in which each one of the second friction members (10) is arranged to be pressed by means of the spring force essentially radially inwardly towards the first friction member (8), which extends around the shaft (1).

3. The damping device according to claim 1, in which said distance is at least 0.3 mm.

4. The damping device according to claim 3, in which said distance is at least 0.4 mm.

5. The damping device according to claim 1, in which each one of said second friction members (10) is arranged to be pressed by means of the spring force to surface abutment towards the first friction member (8) via essentially planar contact surfaces independent of the position of the friction device (10) along said distance.

6. A damping device for a rotatable shaft (1), which supports a centrifugal rotor (5) and is journalled in a bearing (3) in a frame (7) in such a way that an oscillating movement of the shaft (1) relative to the frame (7) is admitted during rotation of the centrifugal rotor (5), the damping device comprising at least one first friction member (13), which is supported by the frame (7) and a number of second friction members (17), which are distributed around the shaft (1) and are connected to said bearing (3) in such a way that the shaft (1) is rotatable relative to the first friction member, each one of the second friction members (17) being arranged to be so pressed by a spring force towards the first friction member (13) in a predetermined direction that upon oscillating movement of the shaft (1) perpendicular to this predetermined direction a damping friction arises when this second friction member (17) together with the shaft (1) is moving relative to said first friction member (13), wherein each one of said second friction members (17) is movable relative to the bearing (3) perpendicular to the shaft (1) and perpendicular to said predetermined direction a limited distance, which is at least 0.2 mm.

7. The damping device according to claim 6, in which the second friction members (17) are arranged to be pressed by means of the spring force essentially radially outwardly towards the first friction member (13).

8. The damping device according to claim 6, in which said distance is at lest 0.3 mm.

9. The damping device according to claim 8, in which said distance is at lest 0.4 mm.

10. The damping device according to claim 6, in which each one of said second friction members (17) is arranged to be pressed by means of the spring force to surface abutment against the first friction member (13) via essentially planar contact surfaces independent of the position of the second friction member (17) along said distance.

* * * * *